W. B. CLEVES.
Measuring Funnel.
No. 61,398.  Patented Jan. 22, 1867.
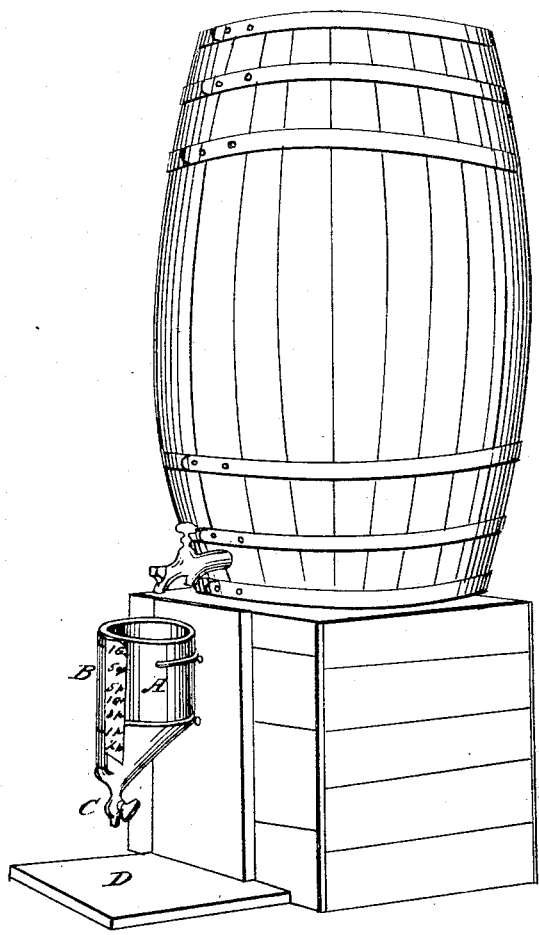

United States Patent Office.

WILLIAM B. CLEVES, OF BINGHAMTON, NEW YORK.

Letters Patent No. 61,398, dated January 22, 1867.

IMPROVEMENT IN MEASURING-FUNNELS.

*The Schedule referred to in these Letters Patent and making part of the same.*

TO ALL WHOM IT MAY CONCERN:

Be it known that I, WILLIAM B. CLEVES, of Binghamton, in the county of Broome, in the State of New York, have invented a new and useful Improvement on Gauge Measures for Measuring Fluids; and I do hereby declare that the following is a full and exact description thereof, reference being had to the accompanying drawings, and to the letters of reference marked thereon, making part of this specification.

Figure 1 is a perspective view of my improvement.

The nature of my invention consists in the peculiar construction of the measure-letter A in combination with the glass gauge-tube B, extending up the side of the measure perpendicularly to its brim and communicating with the inside of said measure at the lower end above the faucet C, the whole being secured to the stand D by means of an adjustable clamp which secures it in an upright position.

I construct my gauge measure, generally, of a less diameter than those in ordinary use, and increase it in height for the purpose of preserving the integrity of the measure as much as possible, should it stand slightly out of perpendicular. I form the lower end of the measure in the shape of a funnel and attach a common faucet to the end of the nose. This makes it more convenient for measuring small quantities. I then attach the glass tube B to the funnel part of the measure above the faucet and secure it with cement. The tube is enclosed in a case, having an opening of sufficient width to snow the height of the fluid. On the side of this case I make the gauge-marks, which indicate the quantity contained in the measure as it rises and falls in the tube.

The ordinary gauge measures now in use are more or less complicated and inaccurate, and the object to be attained is not accomplished with as much facility and ease as with the improvement herein described. I am aware that there are gauge measures for fluids that resemble my improvement in some respects, particularly the one patented January 19, 1863, No. 41,330, designated the "Faucet Measure." I do not "apply" my gauge-tube to the faucet, as this might lead to inaccuracy in the tube; neither do I use a "double scale," as that would produce more or less confusion. Instead of the "three-way faucet" I use the one in ordinary use; consequently I disclaim any interference with the above-named measure or any other with which I am acquainted.

What I claim, and desire to secure by Letters Patent, is—

The peculiar construction of the measure A, in combination with the gauge-tube B, communicating with the inside of the measure above the faucet C, with the single scale to indicate the quantity in the vessel; and the stand D, with the adjustable clamp to hold the measure in its upright position, substantially as described and for the purposes set forth.

W. B. CLEVES.

Witnesses:
JOHN B. BOWEN,
J. O. SIMMONS.